(12) United States Patent
Ruescher et al.

(10) Patent No.: US 6,536,602 B2
(45) Date of Patent: Mar. 25, 2003

(54) FOOD WASTER SEPARATOR

(76) Inventors: Walter August Ruescher, Am Ratzbacgweg 1, 6832 Sulz (AT); Christoph Rudolf Kopetzky, St. Wolfgangsstrasse 10c, 6800 Feldkirch (AT)

( * ) Notice: Subject to any disclaimer, the term of this patent is extended or adjusted under 35 U.S.C. 154(b) by 0 days.

(21) Appl. No.: 09/769,641

(22) Filed: Jan. 25, 2001

(65) Prior Publication Data

US 2002/0096460 A1 Jul. 25, 2002

(51) Int. Cl.[7] .............................. B01B 9/18; B01B 9/14; B01D 29/64
(52) U.S. Cl. ...................... 210/415; 210/411; 210/414; 100/117
(58) Field of Search ................................ 210/415, 414, 210/411; 100/117

(56) References Cited

U.S. PATENT DOCUMENTS

| | | | |
|---|---|---|---|
| 1,624,385 A | * | 4/1927 | Bergen |
| 1,691,867 A | * | 11/1928 | Burns |
| 2,903,960 A | * | 9/1959 | Zies |
| 3,230,865 A | * | 1/1966 | Hibbel et al. |
| 3,426,677 A | * | 2/1969 | Combs et al. |
| 3,743,094 A | | 7/1973 | Mook |
| 3,921,512 A | * | 11/1975 | Burns |
| 4,117,776 A | * | 10/1978 | Hunt |
| 4,147,558 A | | 4/1979 | Fraula et al. |
| 4,212,239 A | | 7/1980 | Fraula et al. |
| 4,219,586 A | * | 8/1980 | Park, Jr. |
| 4,467,717 A | * | 8/1984 | Yamamoto |
| 4,615,801 A | * | 10/1986 | Lee |
| 4,997,578 A | | 3/1991 | Berggren |
| 5,061,366 A | * | 10/1991 | Arai |
| 5,335,866 A | * | 8/1994 | Narao |
| 5,338,451 A | * | 8/1994 | Lindberg et al. |
| 5,632,907 A | * | 5/1997 | Norbury |
| 6,059,971 A | | 5/2000 | Vit et al. |
| 6,258,262 B1 | * | 7/2001 | Katabe |

FOREIGN PATENT DOCUMENTS

| | | |
|---|---|---|
| DE | 19801733 | 7/1999 |
| EP | 0736316 | 10/1996 |

* cited by examiner

*Primary Examiner*—Thomas M. Lithgow
(74) *Attorney, Agent, or Firm*—Luedaka, Neely & Graham, PC

(57) ABSTRACT

A food waste disposal system having a separator for separating food waste solids from liquids. The separator includes a housing having a screw conveyor surrounded by a screen. The solids are introduced into the screen and conveyed by the screw conveyor toward the opposite end. The solids are compacted by the conveyor against a spring loaded member that adjustably blocks passage of the waste to an exit chute.

10 Claims, 7 Drawing Sheets

FOOD WASTER SEPARATOR

FIELD OF THE INVENTION

This invention relates generally to waste disposal systems. More particularly, this invention relates to a separator for a food waste disposal system that separates liquids from solids.

BACKGROUND AND SUMMARY OF THE INVENTION

Food waste disposal typically involves shattering food waste in the presence of water to yield a slurry that is drained to a sewer or is otherwise disposed of. Disposal by sewer is economically disadvantageous and wasteful of water. Disposal of the slurry by other methods likewise involves considerable expense due primarily to the weight of the water included with the solids. In accordance with the invention, there is provided a system for disposing food waste that enables conservation of water and reduction in solids volume.

With regard to the foregoing and other objects, the present invention is directed to a food waste disposal system having a separator for separating food waste solids from liquids.

In a preferred embodiment, the separator includes an elongate housing disposed at a predetermined angle relative to horizontal, a waste inlet, a liquid outlet and a waste outlet each in flow communication with the interior and exterior of the housing. A stationary elongate liquid permeable screen is disposed within the housing and has a length axis substantially aligned with the length of the housing. A conduit is in flow communication with the waste inlet and an interior portion of the screen for introducing food waste solids and liquids into the interior of the screen, and a rotatable screw conveyor having a shaft and a helical blade is provided for conveying the introduced food waste solids in a desired direction is disposed within the screen and substantially aligned with the length of the screen.

A cone member is mounted on the shaft of the rotatable screw adjacent a terminal end of the helical blade and is adjustably positionable between first and second positions on the shaft. A substantially solid member having an aperture therein for insertion of the shaft therethrough is located within the housing adjacent the terminal end of the helical blade to define an impedance to the passage of food waste solids. The aperture is positioned adjacent the cone member and spaced apart from the cone member to define a passage between the cone member and the aperture for the travel of food waste solids to the waste outlet, with the dimension of the passage corresponding to the position of the cone member on the shaft. A spring urges the cone member toward the terminal end of the helical blade.

During operation of the separator the screw conveyor urges waste solids against the cone member to compact the solids and force liquids from the solids and when the urging action of the waste solids against the cone member exceeds the counter-urging of the spring against the cone member. The cone member travels away from the terminal end of the helical blade thereby increasing the size of the passage between the cone member and the aperture. The cone member returns back toward the terminal end of the helical blade when the urging action of the waste solids decreases below that of the spring against the cone member.

BRIEF DESCRIPTION OF THE DRAWINGS

Further advantages of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
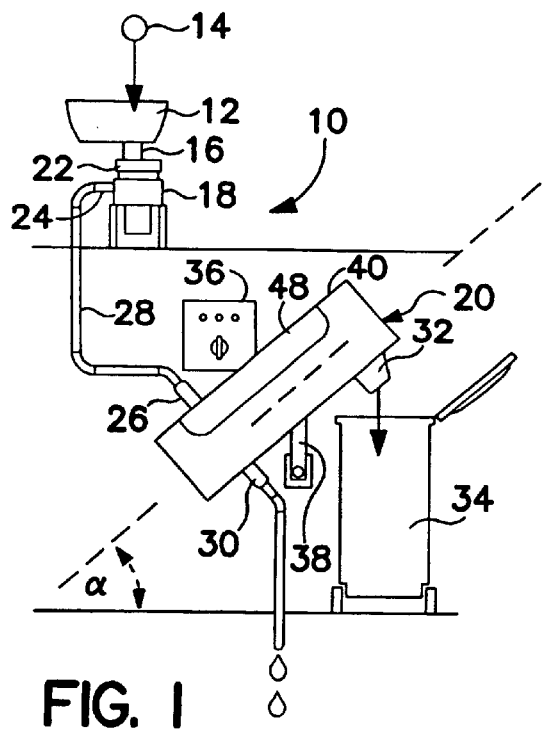
FIG. 1 is a diagrammatic view of a waste disposal system in accordance with the invention.

With initial reference to FIG. 1, the invention relates to a system 10 for disposal of waste, such as food waste. The system 10 is particularly suitable for use in commercial kitchen environments. They system 10 includes as major components a sink 12 having a water source 14 and a drain 16, a disposer 18, and a separator 20.

An inlet 22 of the disposer 18 is in flow communication with the drain 16 and an outlet 24 of the disposer 18 is in flow communication with an inlet 26 of the separator 20 as by a conduit 28. The disposer 18 intakes food waste and water from the sink and shatters the waste to yield a flowable slurry. Preferred disposers are electrically powered disposers available under the brand RED GOAT from Red Goat Disposers, Murfreesboro, Tenn.

The separator 20 receives the slurry via the inlet 26 and separates liquids from solids of the slurry. Separated liquids exit the separator via a liquid outlet 30 and solids are discharged from the separator 20 via an exit chute 32. The discharged liquids may be recirculated to the sink or disposer (or separator as explained below) for water conservation purposes and/or disposed of as by introduction to a sewer.

The yielded solids preferably have a liquid content of from about 10 to about 50% by weight and may be discharged via the chute 32 to a container 34 for transportation to a suitable disposal site. The separator is electrically operated and the operation of the separator may be controlled as by a controller 36 connected to the separator 20. The separator is preferably wall mounted as by a support 38, with the length axis of the separator preferably oriented at an angle $\alpha$ of from about 30 to about 50 degrees relative to horizontal.

Separator 20

Figure 2:
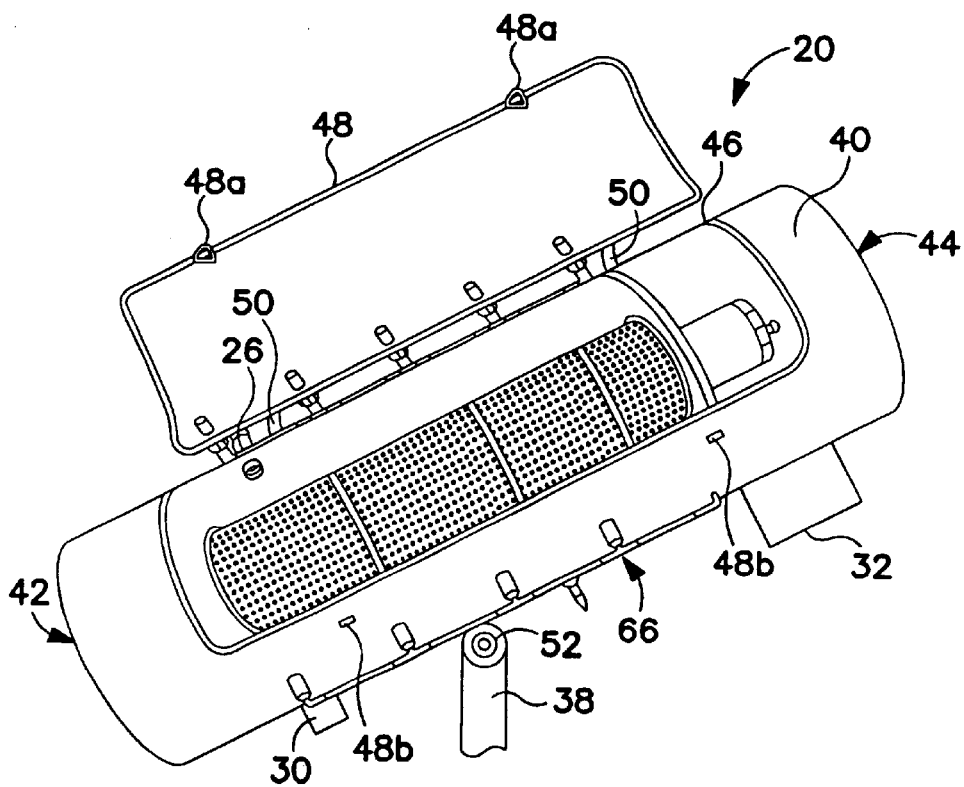
FIG. 2 is a frontal view of a separator component of the system of FIG. 1.
Figure 3:
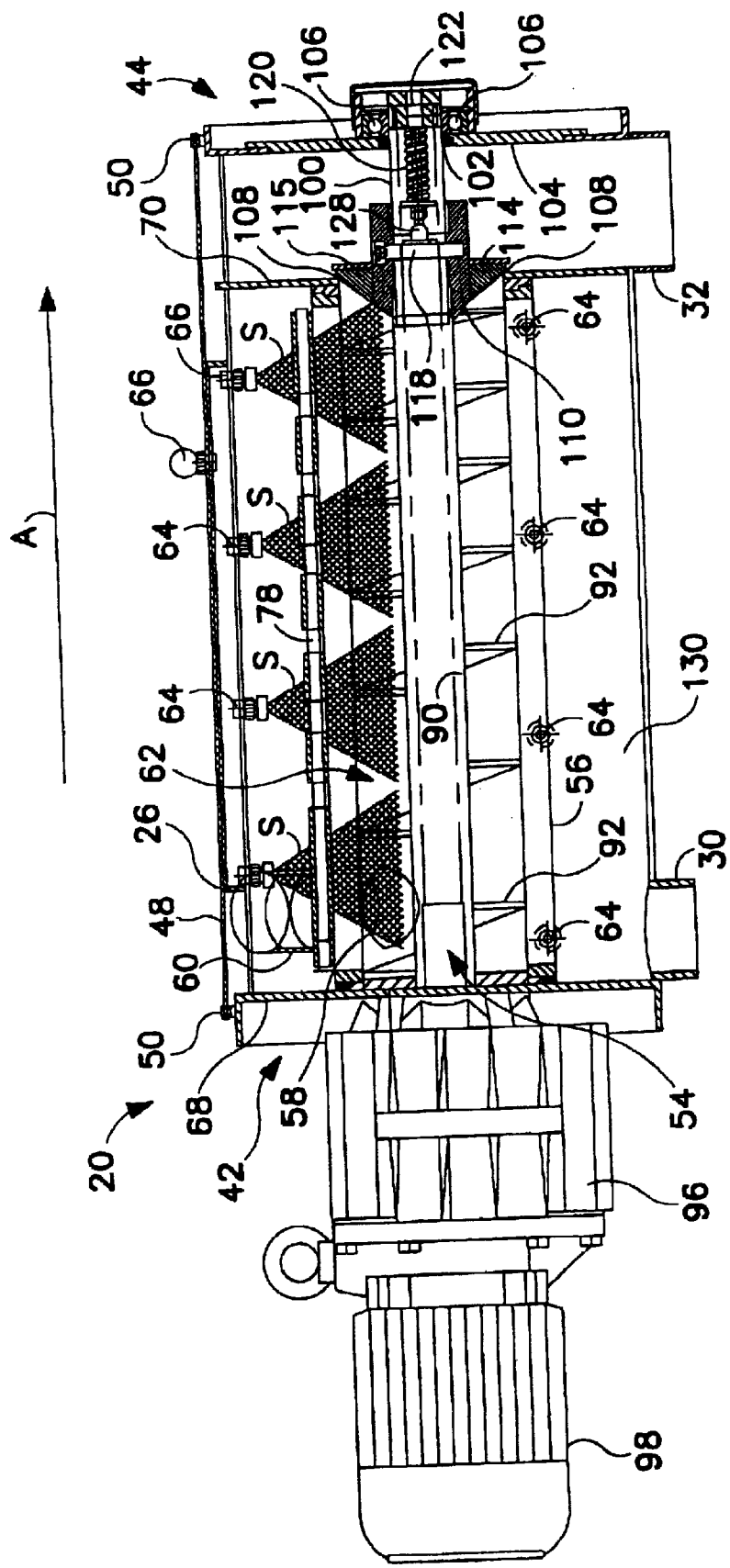
FIG. 3 is a cross-section side view of the separator of FIG. 2.

With general reference to FIGS. 2–3, the separator 20 includes a substantially cylindrical elongate housing 40, preferably of metal construction, having opposite ends 42 and 44. An access port 46 is provided to enable access to a substantial portion of the interior of the housing. The port 46 is sealable as by a lid 48 hingedly connected to the housing 40 by hinges 50. The lid is maintainable in a closed position as by lid latch members 48a on the lid that connect with lid latch members 48*b* on the housing. A mounting member 52 is located substantially centrally on a lower portion of the exterior of the housing 40 for connecting with the support member 38 to enable adjustment of the angle α.

Located within the housing 40 is a screw conveyor 54 rotatably positioned in substantial alignment with the central length axis of the housing 40. A stationary screen unit 56 surrounds the screw conveyor 54. An aperture 58 through the screen unit 56 adjacent end 42 of the housing receives a conduit 60 in flow communication with the inlet 26 for introducing slurry into an annular area 62 defined between the screw conveyor 54 and the screen unit 56.

The introduced slurry is conveyed by the conveyor 54 toward the end 44 of the housing in the direction of arrow A (FIG. 3). Liquids exit the annular area 62 through the screen unit 56 as the components of the slurry travel in the direction of the arow A. Liquid, preferably water, is forced as a spray S against the outer surface of the screen by nozzles 64 of one or more spray assemblies 66 to inhibit clogging of the screen unit 56. The spray S may be continuous or cycled. Also, sanitizing agents or microbial agents, e.g., enzymes, may be introduced into the separator, preferably as part of the spray S. Preferably, at least three spray assemblies, each having a plurality of nozzles 64 are uniformly distributed around the interior of the housing and positioned to thoroughly spray the exterior of the screen unit 56 with sufficient force to inhibit solids from clogging the screen.

Figure 4:
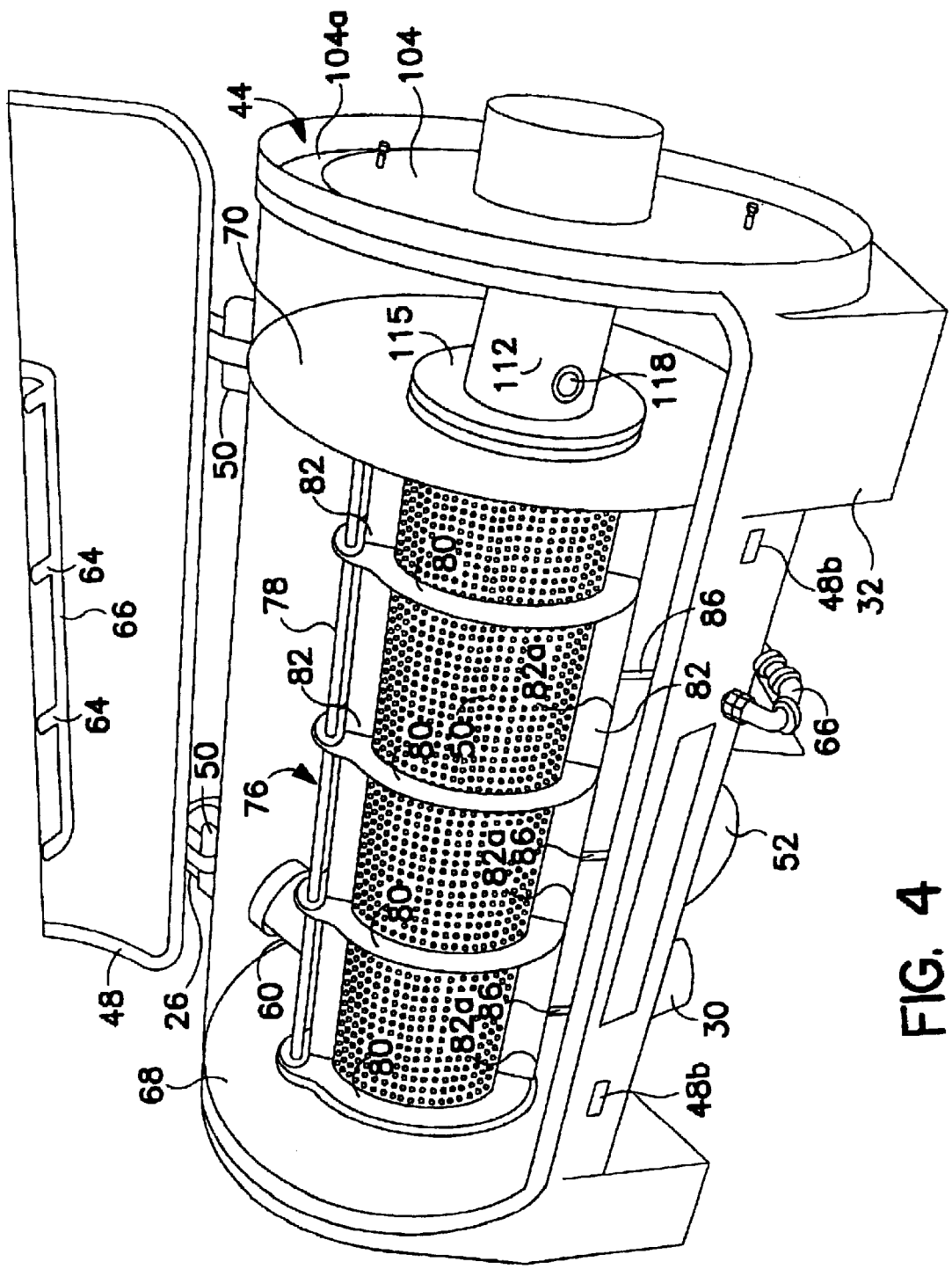
FIG. 4 is a front perspective view of an interior portion of the separator of FIG. 2 showing a screen component thereof.
Figure 5:
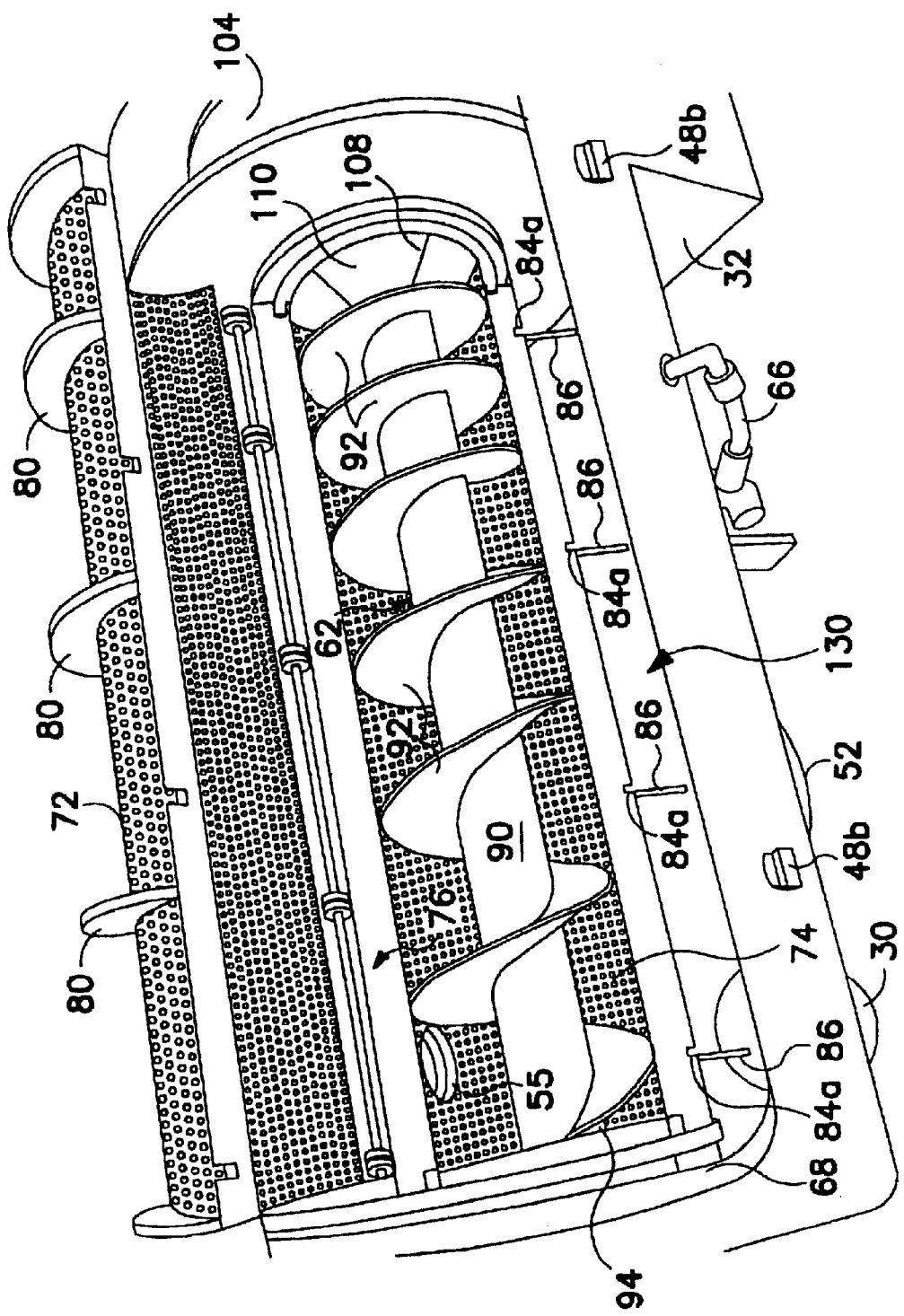
FIG. 5 is a front perspective view of the an interior portion of the separator of FIG. 2 showing a screw conveyor component thereof.

With additional reference to FIGS. 3–5, the screen unit 56 extends between circular washer plates 68 and 70 located within the housing 20. The screen unit 56 is preferably substantially cylindrical in shape, having a top section 72 hingedly connected to a bottom section 74 by hinge assembly 76. The screen unit preferably is provided by a stainless steel screen material having a suitable mesh size to maintain solids therein.

The hinge assembly 76 includes a rod 78 extending between and connected to the plates 68 and 70 and a plurality of upper hinge members 80 fixedly connected to the top section 72, as by welds, and rotatably connected to the rod 78. Lower hinge members 82 are likewise fixedly connected to the bottom section and rotatably connected to the rod 78 for supporting the bottom section in a desired position. A flange 82 is located along the free or front edge of the top section 72 and a flange 84 is located along the front edge of the bottom section 74 such that the flanges 82 and 84 meet adjacent one another when the top section 72 is closed over the bottom section 74. Grooves 82*a* and 84*a* are located on the front edges of the flanges 82, 84, respectively, for receiving latch members 86 for maintaining the top section 72 connecting relationship with the bottom section 74 when the separator is in use.

The screen unit 56 surrounds the screw conveyor 54. The screw conveyor 54 includes a rotatable pipe or shaft 90 preferably having a single helical blade or screw 92 affixed, as by welding, along the length of the shaft 90. Material entering the annular area 62 via the conduit 60 is moved along the length of the screw conveyor 54 by rotation thereof.

As will be noted with reference to FIG. 5, the flight spacing or density of the blade 92 preferably increases in the direction of the arrow A so that solids in the slurry are compacted as they are conveyed toward the end 44. The increase of the flight density may be uniform or in stages.

Figure 8:
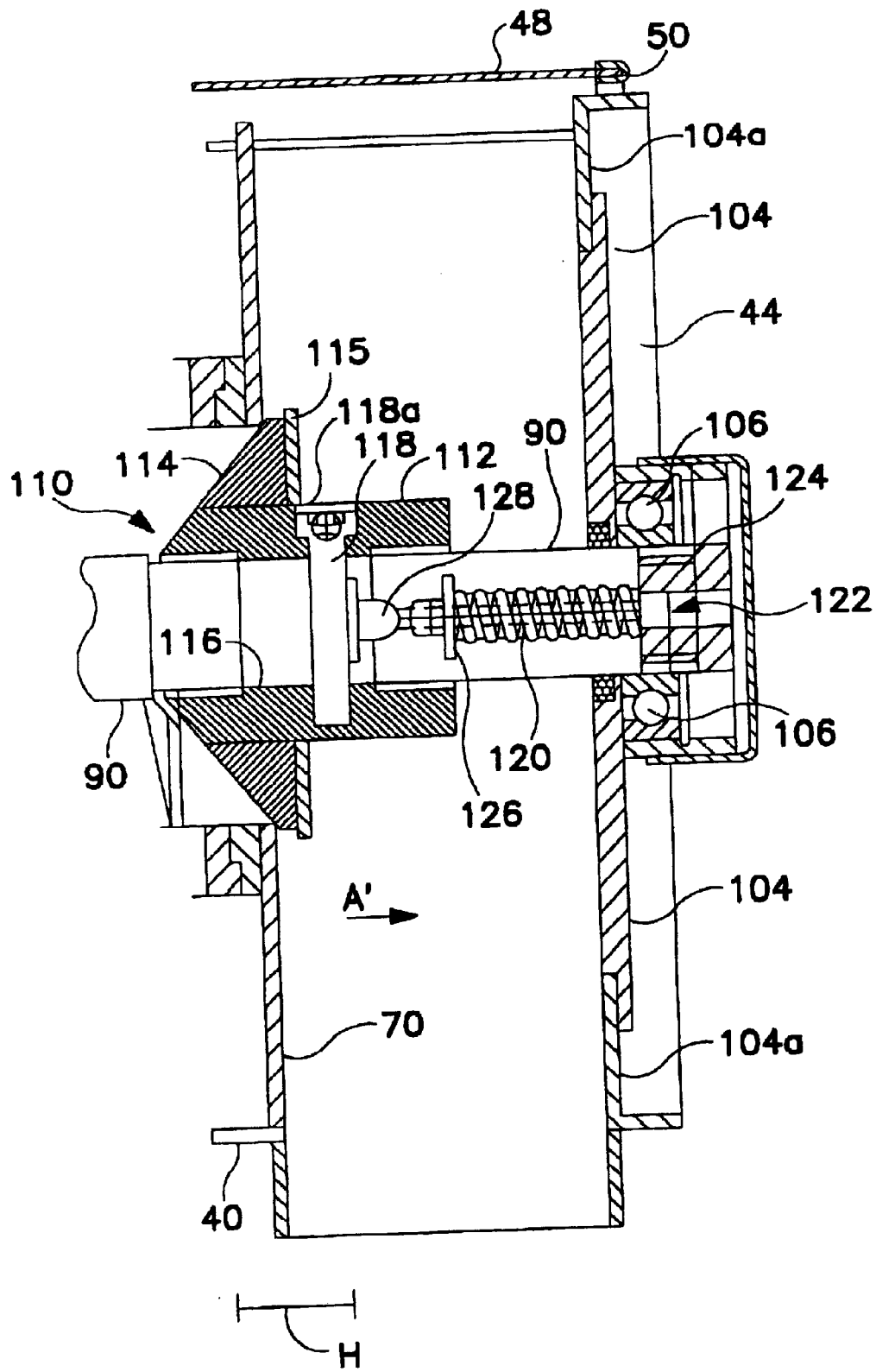
FIG. 8 is a cross-sectional view showing mounting of the cone component.

One end of the shaft 90 extends through an aperture 94 through the plate 68 and cooperates with a reduction gear box or drive unit 96 powered by an electric motor 98 for powered rotation of the screw conveyor 54 (FIG. 3). The drive unit 96 is preferably a direct drive gear-type unit. The motor 98 is in electrical communication with the control unit 36 for controlling the operation of the separator 20. Opposite end 100 of the shaft 90 of the screw conveyor 54 extends through an aperture 102 of an end plate 104 and is supported by bearing 106 (FIG. 3). The plate 104 is affixed, as by welding, to a ring 104*a* connected to the housing 40 (FIG. 8). An aperture 108 through the plate 70 permits passage of an intermediate portion of the shaft 90.

Figure 6:
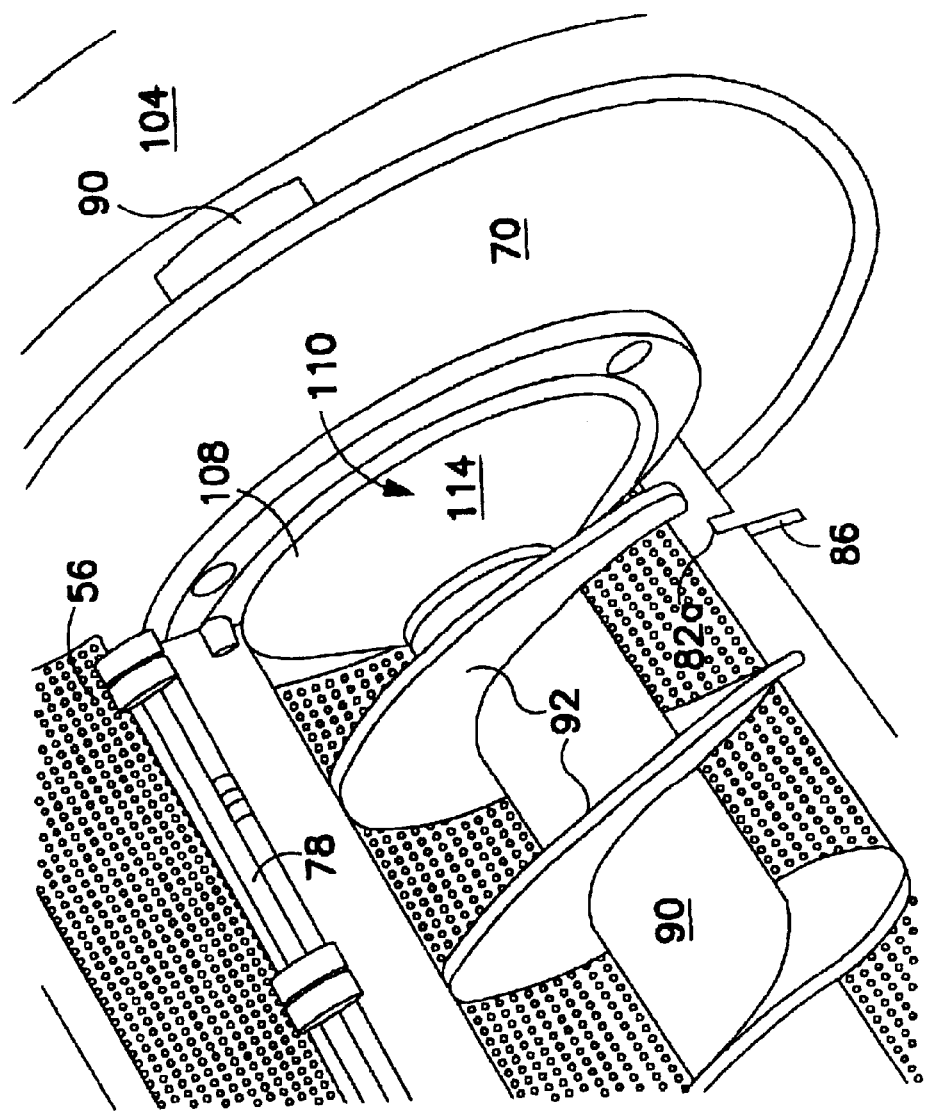
FIG. 6 is a close-up view of an interior portion of the separator of FIG. 2 showing a cone component thereof relative to the screw conveyor component.
Figure 7:
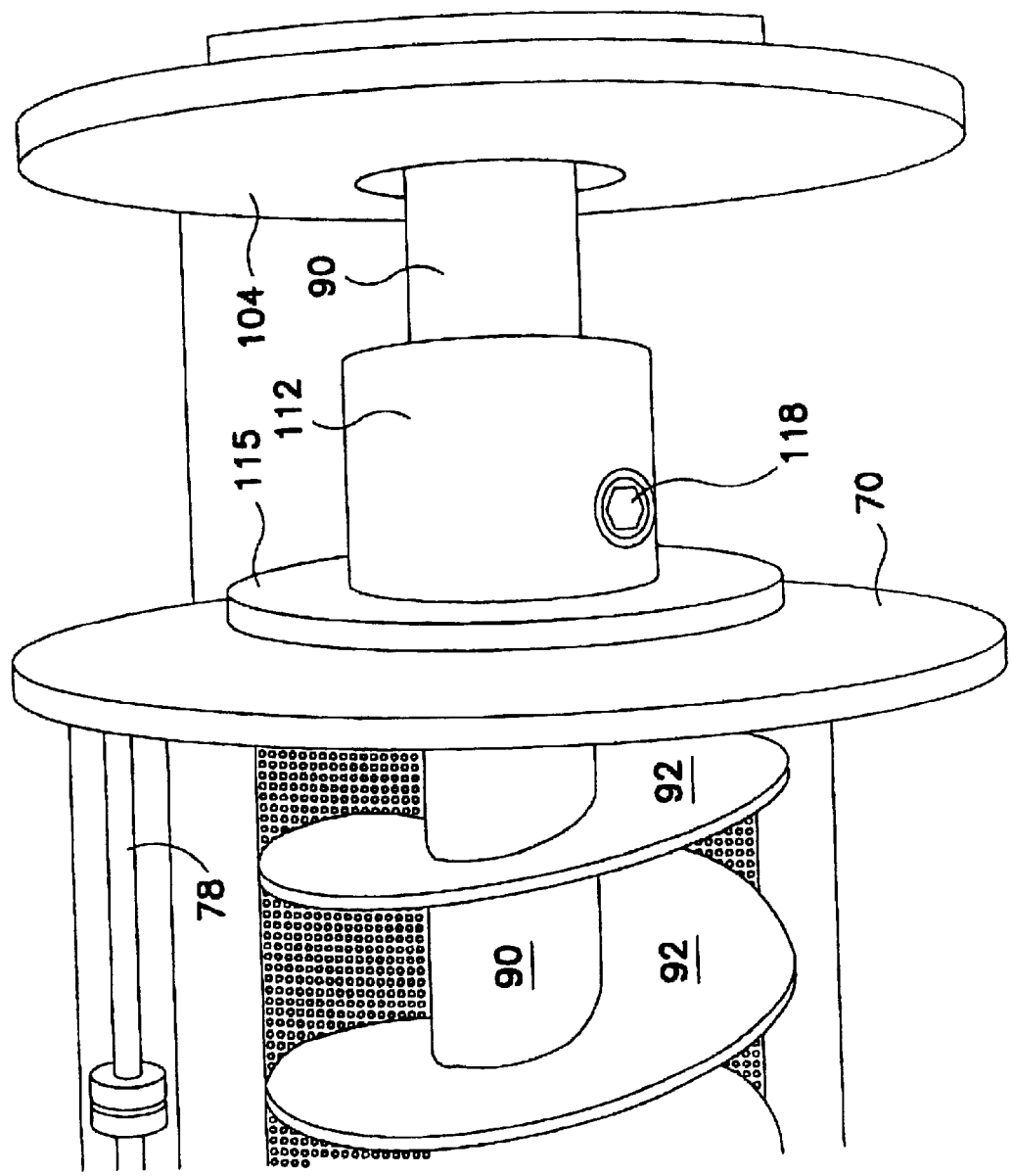
FIG. 7 is a close-up view showing mounting of the cone component.

With additional reference to FIGS. 6–8, a cone member 110 is mounted on the shaft 90 and yieldably positionable along a portion of the length of the shaft 90 adjacent the aperture 108 of the plate 70 for facilitating compaction of waste solids thereby controlling discharge thereof to the chute 32. The cone member 110 includes a shaft 112 supporting a tapered or cone-shaped head 114 having a flange 115. The cone member 110 is mounted to rotate with the shaft 90 without relative movement thereof. The greatest diameter of the cone-shaped head is less than that of the aperture 108, and the diameter of the flange 115 is greater than that of the aperture 108.

In this regard, an elongate slot 116 extends through the shaft 90 for slidably receiving a fastener, such as a bolt 118, passed through a corresponding aperture 118*a* through the shaft 112 of the cone member 110. The length of the slot 116 corresponds to the height H of the cone member 110. This enables the position of the cone member 110 to vary relative to the aperture 108 of the plate 70.

The position of the cone member 110 relative to the aperture 108 is controlled by a compression spring 120 that applies force between the bolt 118 of the cone member 110 and a stop 122, such as a cap or other structure that positively fixes the position of end 124 of the spring 120. Opposite end 126 of the spring is preferably connected to a pusher 128 that bears against the bolt 118. The spring 120 may be configured to have adjustable bias, i.e., by winding or unwinding its coils, or of fixed bias. As solid waste builds at the end of the screw conveyor adjacent the cone member, the cone member is pushed in opposition to the force of the spring 120 in the direction of the arrow A', which allows waste to pass toward the exit chute 32.

During operation of the separator, a slurry having liquids and comminuted waste solids and liquids enters the annular area 62 via the conduit 60. This slurry is conveyed by the blade 92 of the screw conveyor 54 in the direction of the arrow A. Liquid is separated from the solids by gravity, by movement induced by the screw conveyor, and by pressure or squeezing exerted by the screw conveyor which tends to compact the solids.

The screen unit 56 retains the solids within the annular area 62, while liquids drain through the screen unit 56 and into an open area 130 below the screen unit 56 for draining from the housing via the conduit 30. As mentioned previously, liquid, preferably water, is forced as spray S against the outer surface of the screen by the nozzles 64 of spray assembly 66 to inhibit clogging of the screen unit 56. The source of water for feeding to the nozzles 64 is preferably provided, at least in part, by water recycled from the conduit 30. Water recovered from the conduit 30 may also be used as a source of water for the water source 14.

The solids compact as they approach the cone member 110. When the pressure exerted by the solids motivated by the screw conveyor against the cone member exceeds the pressure exerted by the compression spring against the cone member, the cone member is moved along the shaft in the direction of the arrow A' toward the end 44. This movement of the cone member 110 results in an increase in the spacing between the aperture 108 and the head of the cone member to increase the flow of material from the annular area 62 to the chute 32. Likewise, a decrease in the pressure applied against the cone member by the waste tends to cause the cone member to move back in the opposite direction and reduce the flow of material to the chute. The travel of the cone member in the direction of the arrow A' is limited by the length of the elongated slot 116, e.g., the bolt 118 contacting the end of the slot. The travel of the cone member 110 in the opposite direction is limited by the bolt 118 contacting the end of the slot 116 and/or the flange 115 contacting the plate 70. The buildup of waste against the cone member 110 results in pressure being applied to the waste. This pressure serves to squeeze additional liquids from the waste, reducing the water content of the waste discharged through the chute 32. The spring force may be adjusted or otherwise selected for a given waste composition to yield discharged waste of substantially uniform moisture content.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A separator for separating comminuted food waste solids from liquids, the separator, comprising:
    an elongate housing disposed at a predetermined angle relative to horizontal, a waste inlet, a liquid outlet and a waste outlet, the inlet and outlets being in flow communication with the interior and exterior of the housing;
    a stationary elongate liquid permeable screen disposed within the housing and having a length axis substantially aligned with the length of the housing;
    a conduit in flow communication with the waste inlet and an interior portion of the screen for introducing food waste solids and liquids into the interior of the screen;
    a rotatable screw conveyor having a hollow rotatable shaft and a helical blade for conveying food waste solids in a desired direction, the rotatable screw conveyor being disposed within the screen and substantially aligned with the length of the screen;
    a cone member mounted on the shaft of the rotatable screw adjacent a terminal end of the helical blade, the cone member being adjustably positionable between first and second positions on the shaft;
    a substantially solid member having an aperture therethrough for passage of the shaft, the solid member being located within the housing adjacent the terminal end of the helical blade to define an impedance to the passage of food waste solids, the aperture being positioned adjacent the cone member and spaced apart from the cone member to define a passage between the cone member and the aperture for the travel of food waste solids to the waste outlet, with the dimension of the passage corresponding to the position of the cone member on the shaft; and
    a spring operably associated with the cone member and located within the shaft to urge the cone member toward the terminal end of the helical blade.

2. The separator of claim 1, wherein during operation of the separator the screw conveyor urges waste solids against the cone member to compact the solids and force liquids from the solids and when an urging action of the waste solids against the cone member resulting from the operation of the screw conveyor exceeds a counter-urging action of the spring against the cone member, the cone member travels away from the terminal end of the helical blade thereby increasing the size of the passage between the cone member and the aperture, with the cone member returning back toward the terminal end of the helical blade when the urging action of the waste solids decreases below that of the spring against the cone member.

3. The separator of claim 1, wherein liquids separated from the waste solids pass through the screen and travel to the liquid outlet for discharge from the separator.

4. The separator of claim 1, further comprising a plurality of nozzles in flow communication with the interior of the housing for directing a liquid spray toward the screen.

5. The separator of claim 1, wherein the housing is oriented at an angle of from about 30 to about 50 degrees relative to horizontal.

6. A waste disposal system, comprising:
    a sink having a liquid source and a drain in flow communication therewith;
    a disposer in flow communication with the drain of the sink for shattering solid materials introduced into the disposer from the sink and yielding a slurry;
    a separator in flow communication with an exit end of the disposer for separating liquid and solid components of the slurry from one another, the separator, comprising:
    an elongate housing disposed at a predetermined angle relative to horizontal, a waste inlet, a liquid outlet and a waste outlet, the outlets being in flow communication with the interior and exterior of the housing and the waste inlet being in flow communication with the exit end of the disposer;
    a stationary elongate liquid permeable screen disposed within the housing and having a length axis substantially aligned with the length of the housing;
    a conduit in flow communication with the waste inlet and an interior portion of the screen for introducing food waste solids and liquids into the interior of the screen;
    a rotatable screw conveyor having a hollow rotatable shaft and a helical blade for conveying food waste solids in a desired direction, the rotatable screw conveyor being disposed within the screen and substantially aligned with the length of the housing;
    a cone member mounted on the shaft of the rotatable screw adjacent a terminal end of the helical blade, the cone member being adjustably positionable between first and second positions on the shaft;
    a substantially solid member having an aperture therethrough for passage of the shaft, the solid member being located within the housing adjacent the terminal end of the helical blade to define an impedance to the passage of food waste solids, the aperture being positioned adjacent the cone member and spaced apart from the cone member to define a passage between the cone member and the aperture for the travel of food waste solids to the waste outlet, with the dimension of the passage corresponding to the position of the cone member on the shaft; and
    a spring operably associated with the cone member and located within the shaft to urge the cone member toward the terminal end of the helical blade.

7. The system of claim 6, wherein during operation of the separator the screw conveyor urges waste solids against the cone member to compact the solids and force liquids from the solids and when an urging action of the waste solids against the cone member resulting from the operation of the screw conveyor exceeds a counter-urging action of the spring against the cone members, the cone member travels away from the terminal end of the helical blade thereby increasing the size of the passage between the cone member and the aperture, with the cone member returning back toward the terminal end of the helical blade when the urging action of the waste solids decreases below that of the spring against the cone member.

8. The system of claim 6, wherein liquids separated from the waste solids pass through the screen and travel to the liquid outlet for discharge from the separator.

9. The system of claim 6, wherein the separator further comprises a plurality of nozzles in flow communication with the interior of the housing for directing a liquid spray toward the screen.

10. The system of claim 6, wherein the housing of the separator is oriented at an angle of from about 30 to about 50 degrees relative to horizontal.

* * * * *